United States Patent
Bugeja

(10) Patent No.: US 6,220,560 B1
(45) Date of Patent: Apr. 24, 2001

(54) PLATE HOLDER

(76) Inventor: Lawrence Charles Bugeja, 89 Watkins Street, White Gum Valley, Western Australia, 6162 (AU)

( * ) Notice: Subject to any disclaimer, the term of this patent is extended or adjusted under 35 U.S.C. 154(b) by 0 days.

(21) Appl. No.: 09/089,917

(22) Filed: Jun. 3, 1998

(30) Foreign Application Priority Data

Jun. 4, 1997 (AU) .................................................. PO7175

(51) Int. Cl.⁷ .................................................. A47F 1/14
(52) U.S. Cl. .................... 248/473; 248/309.1; 269/302.1
(58) Field of Search .................... 248/473, 346.01, 248/312.1, 318, 346.07, 346.03, 346.5, 694, 309.1; 211/41.1, 41.2, 41.7; 294/34, 143; 220/759; 312/280; 108/26; 269/302.1, 289 R, 15

(56) References Cited

U.S. PATENT DOCUMENTS

| 601,753 | * | 4/1898 | Kaiser | 211/41.2 |
| 602,324 | * | 4/1898 | Hautsch | 220/759 |
| 1,167,934 | * | 1/1916 | Roth | 294/143 |
| 2,564,571 | * | 8/1951 | Havens | 220/574.1 |
| 4,033,009 | * | 7/1977 | Hoinash | 220/759 |
| 4,123,128 | * | 10/1978 | Abele | 312/244 |
| 4,505,393 | | 3/1985 | Fleigle et al. | 211/41 |
| 4,505,394 | | 3/1985 | Reimer | 211/41 |
| 4,776,469 | | 10/1988 | Geleziunas | 211/41 |
| 4,907,789 | * | 3/1990 | Tice | 269/13 |
| 4,961,555 | * | 10/1990 | Egan, Jr. | 248/231.81 |
| 5,031,975 | * | 7/1991 | Anderson | 312/319 |
| 5,110,170 | | 5/1992 | Boatwright | 294/146 |
| 5,350,069 | | 9/1994 | Agwu | 206/454 |
| 5,474,494 | * | 12/1995 | Sims | 452/194 |
| 5,527,022 | * | 6/1996 | Gibson | 269/13 |
| 5,884,883 | * | 3/1999 | Millington | 248/309.1 |
| 5,938,185 | * | 8/1999 | Kletter | 269/289 R |

FOREIGN PATENT DOCUMENTS

| 141710 | 12/1949 | (AU) . |
| 230287 | 1/1959 | (AU) . |
| 241026 | 2/1960 | (AU) . |
| 661193 | 7/1987 | (CH) . |
| 245447 | 9/1926 | (GB) . |
| 2074439 | 11/1981 | (GB) . |
| 2264224 | 8/1993 | (GB) . |
| 2311460 | 10/1997 | (GB) . |

* cited by examiner

Primary Examiner—Anita M. King
(74) Attorney, Agent, or Firm—Christie, Parker & Hale, LLP

(57) ABSTRACT

A plate holder (10) includes a base member (12) having an upper surface (13), an end surface (15) adjacent the upper surface (13) and a first recess (14) extending inwardly of the end surface (15), the first recess (14) being shaped and oriented relative to the upper surface (13) so that, in use, when the upper surface (13) is oriented substantially horizontally and a plate (30) is engaged in the first recess (14), the plate is held relative to the base member (12) and thereby is restrained from disengaging with the first recess (14) by force of gravity.

9 Claims, 4 Drawing Sheets

PLATE HOLDER

BRIEF DESCRIPTION OF THE INVENTION

The present invention relates to a plate holder.

FIELD OF THE INVENTION

In preparing or serving food it can be difficult to both hold a plate and transfer food onto the plate. When food on a plane surface is to be moved onto the plate, the current method is to locate the plate adjacent the plane surface and to move the food from the edge of the plane surface onto the plate. However, since plates are generally circular in shape, with this method it is common for food to pass through gaps between the plane surface and the plate.

The present invention seeks to overcome some, if not all, of the above mentioned problems.

SUMMARY OF THE PRESENT INVENTION

In accordance with a first aspect of the present invention there is provided a plate holder including a base member having an upper surface, an end surface adjacent the upper surface and a recess extending inwardly of the end surface, the recess being shaped and oriented relative to the upper surface so that, in use, when the upper surface is oriented substantially horizontally and a plate is engaged in the recess, the plate is held relative to the base member and thereby is restrained from disengaging with the recess by force of gravity.

Preferably, the recess has a lip portion for receiving a lip of the plate and a base portion for receiving a base of the plate.

BRIEF DESCRIPTION OF THE INVENTION

The present invention will now be described, by way of example, with reference to the accompanying drawings, in which.

BRIEF DESCRIPTION OF THE INVENTION

Figure 1:
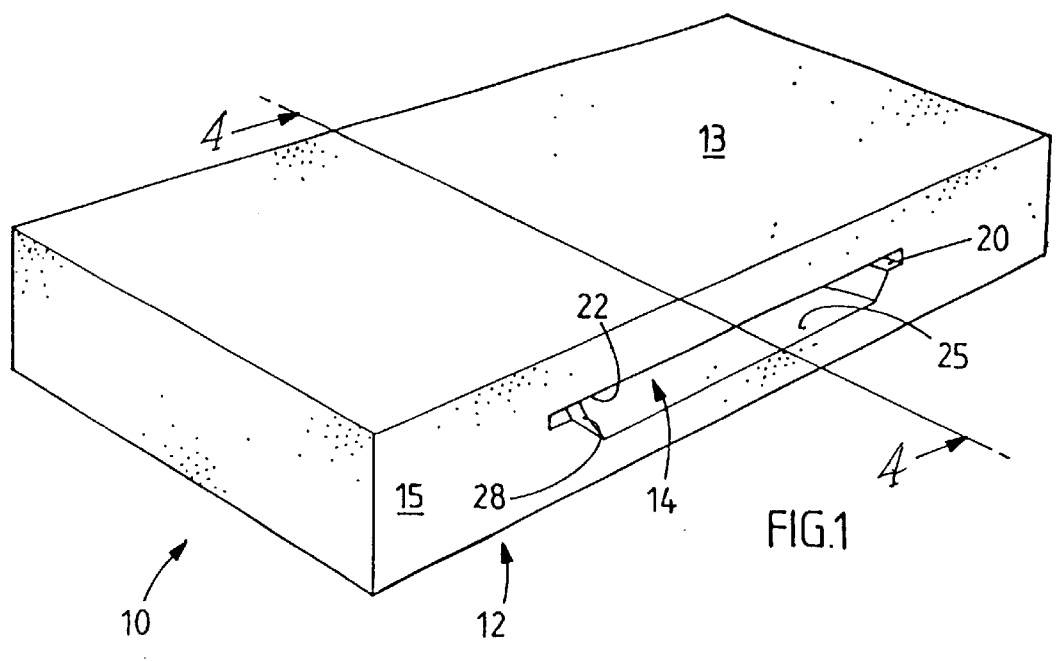
FIG. 1 is an upper perspective view of the plate holder in accordance with the present invention.
Figure 2:
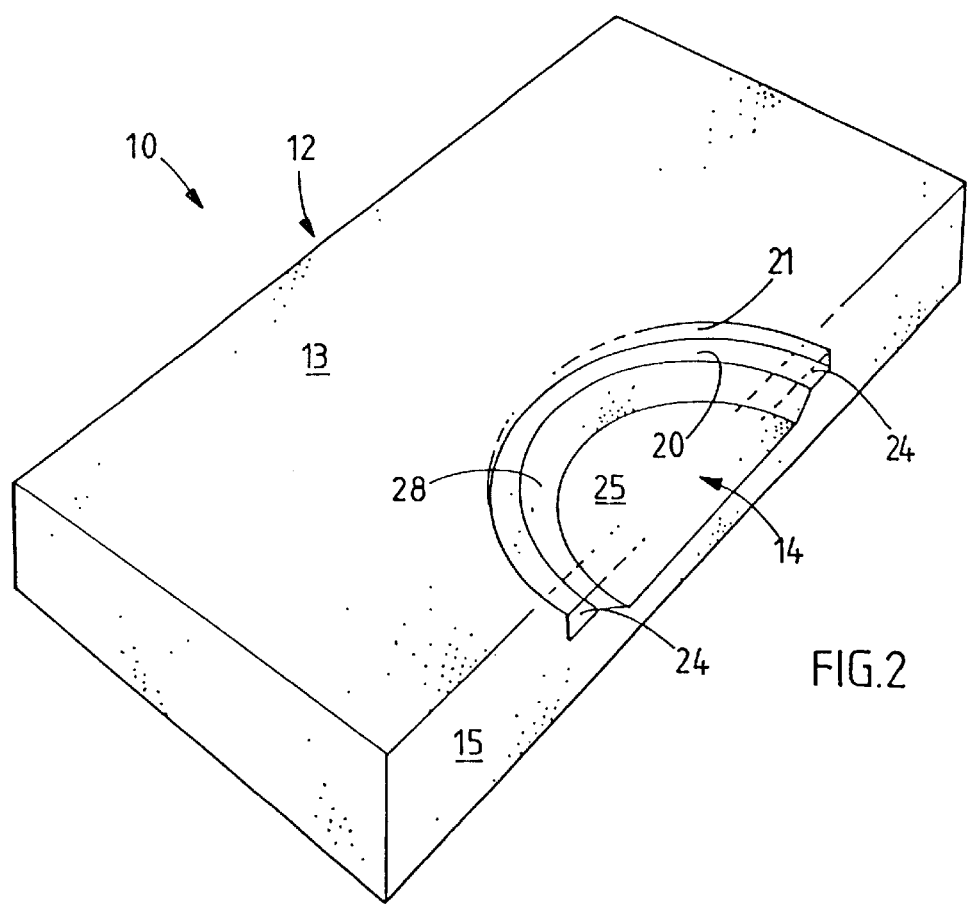
FIG. 2 is an upper perspective view of the plate holder of FIG. 1 with a cut away section showing a recess of the plate holder.

Referring to the Figures, there is shown a plate holder 10 which includes a base member 12 having an upper surface 13, an end surface 15 and a recess 14 extending inwardly of the end surface 15 into the interior of the base member 12.

The recess 14 is defined by a base surface 25, a lower surface 20, an arcuate surface 21, an upper surface 22 and an inclined surface 28. A lip portion 16 of the recess 14 is defined by the lower surface 20, the arcuate surface 21 and a portion of the upper surface 22 adjacent the arcuate surface 21. A base portion 18 of the recess 14 is defined by the base surface 25 and the inclined surface 28.

The recess 14 is of a shape which is complementary to the shape of a plate, the lip portion 16 being shaped to receive, in use, the lip of the plate and the base portion 18 being shaped to receive, in use, the base of the plate.

The lip portion 16 forms an arcuate groove that extends around the base portion 18. The base portion 18 is the shape of a truncated half cone. The inclined surface 28 forms an arcuate surface that extends around the base surface 25, the angle of inclination and configuration of the inclined surface 28 being such that, in use, a plate will fit within the base portion 18 with the inclined surface 28 being disposed adjacent and substantially parallel to an inclined outer surface of the plate. The distance between the upper surface 22 and the base surface 25 is such that the height of the plate may fit between the upper surface 22 and the base surface 25.

Figure 3:
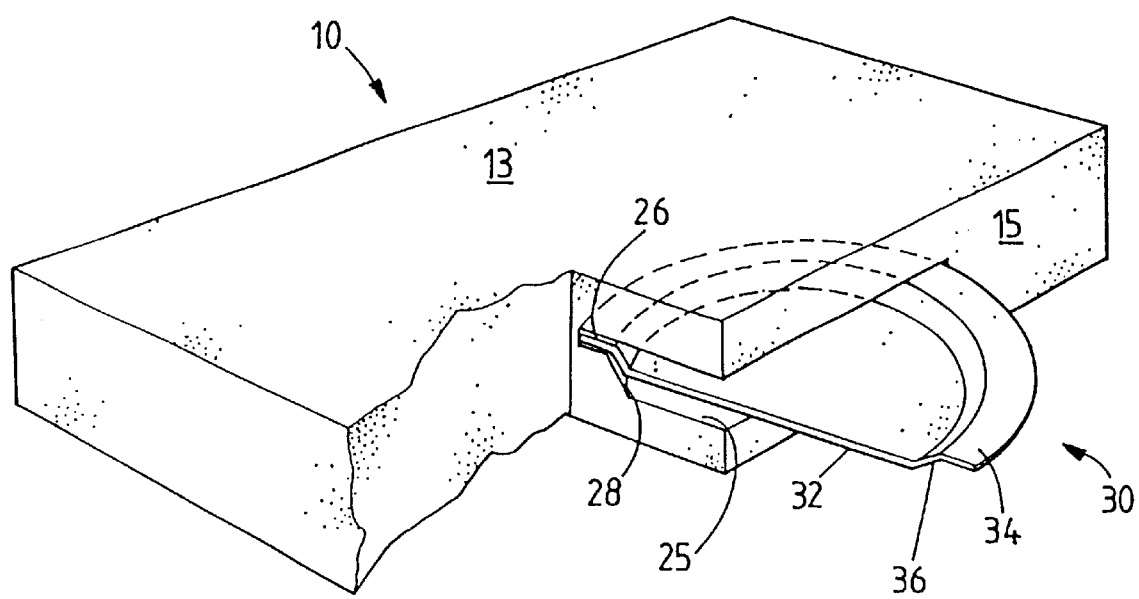
FIG. 3 is an upper perspective view in partial cross section of the plate holder of FIGS. 1 and 2, in use, including a plate engaged in the recess of the plate holder.
Figure 4:
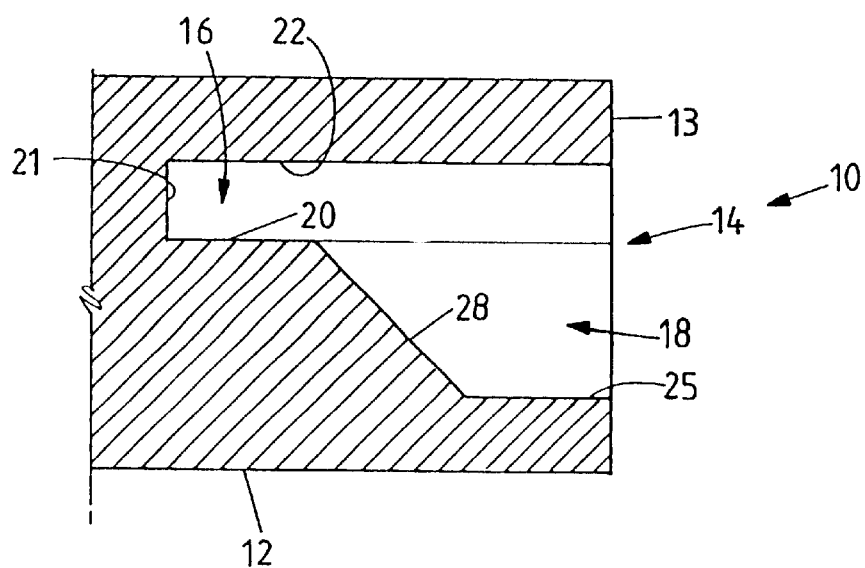
FIG. 4 is a cross sectional side view of the plate holder along the line IV—IV of FIG. 1.

Referring to FIG. 3, there is shown a plate 30 received within the recess 14 of the plate holder 10. The plate 30 has a base 32, a lip 34 and an inclined portion 36 intermediate the lip 34 and the base 32. The plate 30 is received within the recess 14 of the plate holder 10 such that the inclined portion 36 abuts the inclined surface 28, the lip 34 is received within the lip portion 16 between the upper surface 22 and the lower surface 20, and the base 32 is received within the base portion 18 between the upper surface 22 and the base surface 25.

The plate 30 is restrained from disengaging with the recess 14 by force of gravity as follows.

If the combination of the plate 10 and food on the plate 10 has a centre of gravity which is located outside of the recess 14, then the mechanism for restraining the plate is as follows:

Under gravity, the plate 30 exerts a downward force on two fulcrum points 24. The fulcrum points 24 are located on either side of the plate 30 where the lip 34 meets the lower surface 20 and/or the sloping surface 28 adjacent the end surface 15. The fulcrum points 24 cause a portion of the lip 34 which is remote from the end surface 15 and furthermost within the recess 14 to contact the upper surface 22 at a stopping position 26 and exert a force in an upward direction against the upper surface 22. The stopping portion 26 and the fulcrum points 24 cause the plate 30 to be restrained within the recess 14, so that the plate 30 does not fall out of the plate holder 10 by gravity.

If the combination of the plate 10 and food on the plate 10 has a centre of gravity which is located inside the recess 14, then the mechanism for restraining the plate is as follows:

The lip 34 rests on the lower surface 20 and/or the inclined surface 28 by gravity and is held in position by the lower surface and/or the inclined surface so that it does not fall out of the plate holder 10 by gravity.

Figure 5:
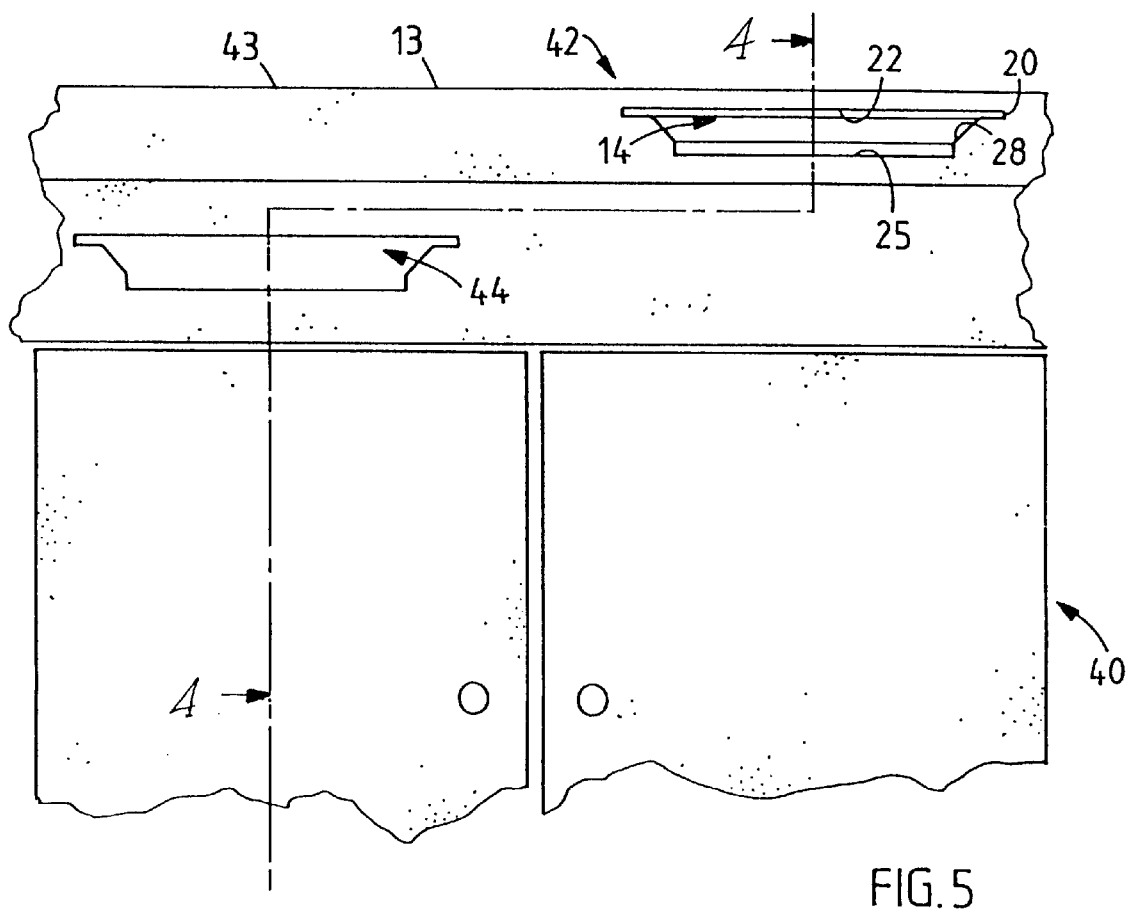
FIG. 5 is a diagrammatic front view of a cupboard provided with a plate holder in accordance with the present invention.
Figure 6:
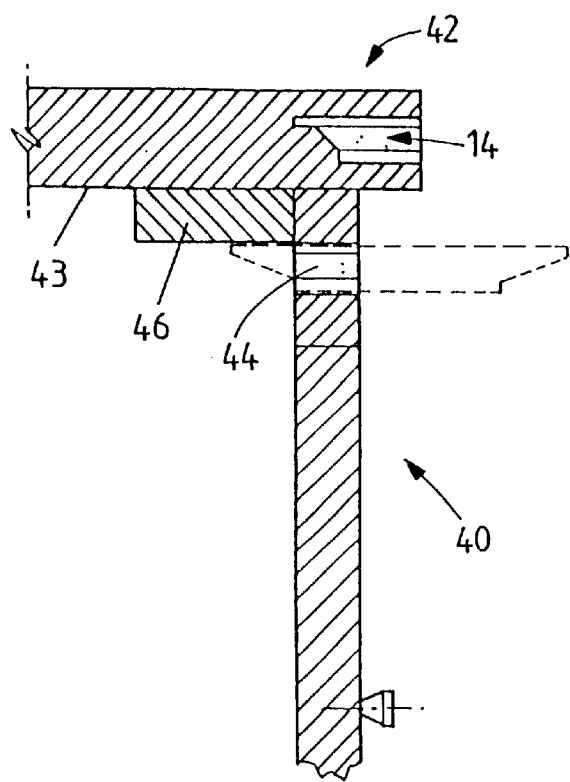
FIG. 6 is a diagrammatic cross sectional view along the line VI—VI of the cupboard shown in FIG. 5.

In FIGS. 5 and 6 there is shown a cupboard 40 provided with a plate holder 42 in accordance with the present invention. Like features have been indicated with like reference numerals. In this embodiment, the recess 14 of the plate holder 42 is formed in an upper panel 43 of the cupboard, which panel may include an upper surface 13 suitable for preparing food material.

The cupboard may also include an aperture 44 of complimentary shape to a plate and a restraining panel 46. The arrangement is such that, in use, a plate may partially pass through the aperture so that a portion of the plate protrudes rearwardly of the aperture and by force of gravity abuts against the restraining panel 46. In this way, the plate is restrained from disengaging with the aperture and falling under force of gravity.

Figure 7:
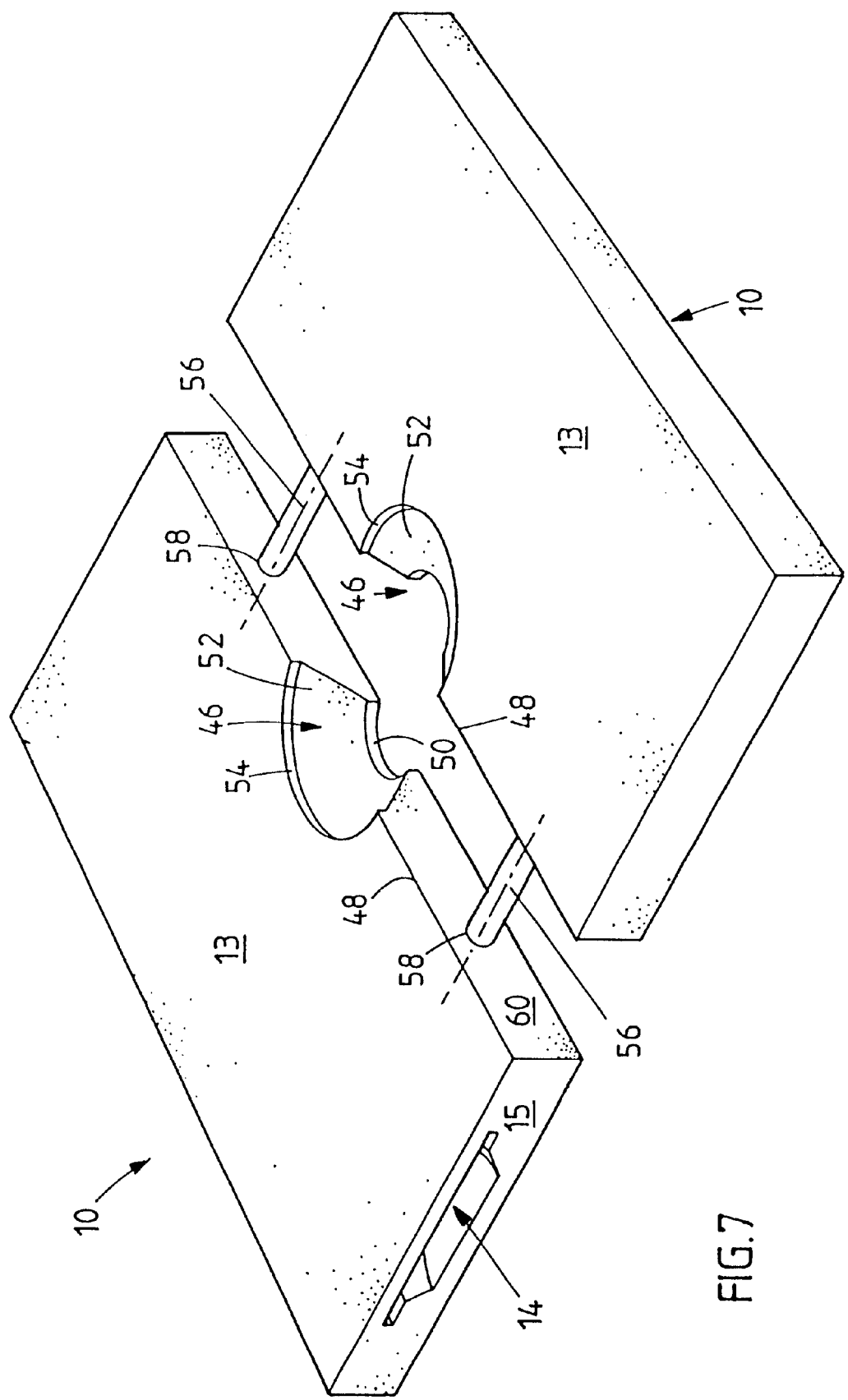
FIG. 7 is an upper perspective view of an alternative embodiment of a plate holder in accordance with the present invention.

FIG. 7 shows an alternative embodiment of the invention in the form of a plate holding structure which includes two plate holders 10 connected to each other. Like features have been indicated with like reference numerals. Each plate holder includes a recess 46 formed adjacent a side edge 48 of the plate holder substantially centrally of the edge 48. Each recess is defined by an arcuate lower surface 50, an arcuate inclined surface 52 and an arcuate upper surface 54. The plate holders are connected to each other by pins 56 which engage in corresponding apertures 58 in side surfaces 60 of the plate holders, the pins 56 being slidably received in the apertures 58 so that the recesses 46 are movable towards and away from each other. The shape of each recess is such that together the recesses form a seat for a bowl, the size of the seat being adjustable to accommodate the bowl by moving the plate holders towards or away from each other.

Referring to the Figures, the manner of use and operation of the plate holder of the present invention will now be described.

The plate holder 10 is positioned in a horizontal manner so that the upper surface 22 of the recess 16 is substantially horizontal. The plate holder 10 may be in the form of a cutting board for preparing food, may be recessed within a table top or similar or may form an integral part of a cupboard as shown in FIG. 5. A plate 30 is introduced into the recess 14 and is oriented relative to the recess 14 such that the inclined portion 36 of the plate 30 abuts against the inclined surface 28 of the recess or the lip 34 abuts against the arcuate surface 21. The plate 30 is then held within the recess 14 by gravity. Food material may be placed onto the plate 30 by transferring prepared food from the upper surface 13 of the plate holder 10 and the plate 30 is then withdrawn from the plate holder 10.

Modifications and variations that would be deemed apparent to a skilled addressee are deemed to be within the scope of the present invention.

What is claimed is:

1. A plate holder including a base member having an upper, substantially planar surface for cutting food and enabling the transfer of the food to a plate by urging the food in a direction toward the plate to a location beyond an end of the planar surface, the base member including an end wall being formed with a first recess extending inwardly into the end wall, the first recess being formed having dimensions to receive a sufficient portion of the plate to restrain the plate and thus prevent the plate from disengaging with the first recess when the base member is oriented substantially horizontally.

2. A plate holder as claimed in claim 1, wherein the first recess includes a lip portion for receiving a lip of the plate and a base portion for receiving a base of the plate.

3. A plate holder as claimed in claim 2, wherein the lip portion is a substantially arcuate shaped groove.

4. A plate holder as claimed in claim 2, wherein the base portion is defined by a base surface and a substantially arcuate shaped inclined surface extending around the base surface.

5. A plate holder as claimed in claim 1, wherein the first recess is shaped such that when the plate is engaged in the first recess a substantial portion of a base of the plate protrudes from the first recess.

6. A plate holder as claimed in claim 1, wherein the plate holder defines a second recess, and further including at least one aperture formed adjacent the second recess, the at least one aperture being adapted to slidably receive a pin.

7. A plate holding structure including first and second plate holders in accordance with claim 6 arranged so that the respective second recesses of the first and second plate holders face each other and an end of a pin extends from a side surface of the first plate holder and engages an aperture in a respective side surface of the second plate holder adjacent to the second recess of the second plate holder, such that the first and second plate holders are movable relative to each other so as to increase or decrease the combined effective size of the second recesses.

8. A cupboard including a plate holder in accordance with claim 1.

9. A cupboard as claimed in claim 8, further including an aperture for receiving a plate and a restraining panel disposed rearwardly and upwardly of the aperture to allow the plate to be received in the aperture so as to partially protrude rearwardly of the aperture and by the force of gravity abut against the restraining panel so as to thereby restrain the plate from disengaging with the aperture and thereby fall under force of gravity.

* * * * *